(12) United States Patent
Lou (10) Patent No.: US 9,136,905 B2
(45) Date of Patent: Sep. 15, 2015

(54) MULTI-RECEIVING TERMINAL ECHO CANCELLATION METHOD AND SYSTEM

(75) Inventor: Shasha Lou, Weifang (CN)

(73) Assignee: GOERTEK INC., Weifang (CN)

( * ) Notice: Subject to any disclaimer, the term of this patent is extended or adjusted under 35 U.S.C. 154(b) by 274 days.

(21) Appl. No.: 13/816,542

(22) PCT Filed: Apr. 9, 2012

(86) PCT No.: PCT/CN2012/073641
§ 371 (c)(1),
(2), (4) Date: Feb. 12, 2013

(87) PCT Pub. No.: WO2013/097372
PCT Pub. Date: Jul. 4, 2013

(65) Prior Publication Data
US 2013/0243183 A1    Sep. 19, 2013

(30) Foreign Application Priority Data

Dec. 29, 2011 (CN) .......................... 2011 1 0450981

(51) Int. Cl.
*H04B 3/20* (2006.01)
*H04M 9/08* (2006.01)
*H04B 3/23* (2006.01)

(52) U.S. Cl.
CPC ................ *H04B 3/20* (2013.01); *H04M 9/082* (2013.01); *H04B 3/231* (2013.01)

(58) Field of Classification Search
None
See application file for complete search history.

(56) References Cited

U.S. PATENT DOCUMENTS

| | | | |
|---|---|---|---|
| 8,085,947 B2 * | 12/2011 | Haulick et al. | 381/93 |
| 2005/0008145 A1 * | 1/2005 | Gunther | 379/406.08 |
| 2009/0022336 A1 * | 1/2009 | Visser et al. | 381/94.7 |
| 2011/0123046 A1 * | 5/2011 | Hiroe | 381/98 |

* cited by examiner

*Primary Examiner* — Fan Tsang
*Assistant Examiner* — Jeffrey Lytle
(74) *Attorney, Agent, or Firm* — Troutman Sanders LLP (57) ABSTRACT

Disclosed is a method and system for multi-receiving terminal echo cancellation Echo filters performs echo filtering on receiving terminal signals in M channels to obtain filtered receiving terminal signals in M channels. The filtered receiving terminal signals in M channels are subtracted from a transmitting terminal signal to obtain a system output signal in which receiving terminal echoes have been cancelled. The receiving terminal signals in M channels are buffered. A decorrelation matrix according to each of the receiving terminal signals in M channels is calculated. The decorrelation matrix decomposes the buffered receiving terminal signals in M channels into decorrelated receiving terminal signals in M channels. Update amounts of the echo filters are calculated according to the decorrelation matrix, the decorrelated receiving terminal signals in M channels and the system output signal that is fed back.

20 Claims, 5 Drawing Sheets

MULTI-RECEIVING TERMINAL ECHO CANCELLATION METHOD AND SYSTEM

TECHNICAL FIELD

The present invention relates to the field of voice communication technologies, and more particularly, to a multi-receiving terminal echo cancellation method and a multi-receiving terminal echo cancellation system.

DESCRIPTION OF THE RELATED ART

In voice communication, a receiving terminal signal is mixed into a sending terminal signal through line reflection and acoustic reflection and is fed to a remote end so that echoes can be heard at the remote end. The echoes cause great interference to both communicating parties, affect the voice quality and, if serious, even lead to a howling, which not only makes the conversation completely impossible but may also damage communication apparatuses.

In order to ensure the voice quality and the safety of the apparatuses, generally adaptive echo cancellation technologies are adopted to cancel the echoes in the voice communication. An appropriate echo filter is searched adaptively, and an echo signal is calculated so as to be cancelled from the sending terminal signal, thereby preventing the echoes from interfering with the voice communication.

The conventional single-channel echo cancellation technology applies to situations of a single receiving terminal. However, stereo voice communication and even voice communication of more receiving terminals have occurred owning to the development of the communication technologies in recent years, so a suitable multi-channel echo cancellation technology is needed. Each receiving channel corresponds to one echo canceller. An echo corresponding to the receiving terminal signal in that channel is calculated and cancelled from the sending terminal signal. A plurality of echo cancellers operate in cooperation to cancel the echoes caused by a plurality of receiving terminals.

Multi-receiving terminal echo cancellation is difficult in that receiving terminal signals in a plurality of channels are not independent from each other but are correlated; and the searching for an echo canceller corresponding to a certain channel receiving terminal signal is subjected to interference of other receiving terminal signals, so the searching speed is low and timely tracking cannot be achieved when the echo environment is changed. Therefore, eliminating the correlation between the original receiving terminal signals is crucial to improve the multi-channel echo cancellation performance.

The existing technologies for eliminating the correlation between receiving terminal signals in a plurality of channels mostly adopt the pre-distortion approach. In this approach, some distortion signals are added in the receiving terminal signals to reduce the correlation between the receiving terminal signals and the interference between the echo cancellers. This requires providing additional pre-distortion hardware and lines at the receiving terminals, and also reduces the quality and the auditory impression of the received sound. In particular, when a high similarity exists between the original receiving terminal signals, more pre-distortion is required, which will significantly reduce the sound quality of the receiving terminal signals when being replayed.

In order to protect the replayed tone quality of the receiving terminals from being affected, it is required to carry out distortionless decorrelation on the receiving terminal signals. However, the existing distortionless decorrelation technologies are only to perform a simple sum/difference operation on receiving terminal signals in two channels to form new receiving terminal signals with a reduced correlation therebetween. This is suitable for the stable and invariable stereo voice communication which is used for a simple environment, but is unsuitable for use in situations of a variable correlation and cannot support situations in which two or more receiving terminal channels are correlated.

BRIEF SUMMARY OF THE INVENTION

The present invention provides a multi-receiving terminal echo cancellation method and a multi-receiving terminal echo cancellation system. The technical solutions of the present invention can effectively cancel echoes caused by two or more receiving terminals from a sending terminal signal without affecting the replayed tone quality of the receiving terminals, and are suitable for use in situations in which the correlation between a plurality of receiving terminal signals is variable.

To achieve the aforesaid objective, the technical solutions of the present invention are achieved in the following way.

The present invention discloses a multi-receiving terminal echo cancellation method suitable for use in a communication apparatus comprising M receiving terminals. M is a natural number greater than or equal to 2. The method comprises performing echo filtering on receiving terminal signals in M channels by means of echo filters to obtain filtered receiving terminal signals in M channels, and subtracting the filtered receiving terminal signals in M channels from a sending terminal signal to obtain a system output signal in which receiving terminal echoes have been cancelled; and buffering the receiving terminal signals in M channels by means of buffers at the same time, calculating a decorrelation matrix according to each of the receiving terminal signals in M channels that are buffered within a preset length, decomposing the buffered receiving terminal signals in M channels into decorrelated receiving terminal signals in M channels by means of the decorrelation matrix, and calculating update amounts of the echo filters according to the decorrelation matrix, the decorrelated receiving terminal signals in M channels and the system output signal that is fed back.

The present invention further discloses a multi-receiving terminal echo cancellation system, the system comprising an echo filtering unit and a filtering control unit, wherein the echo filtering unit is configured to receive a sending terminal signal and receiving terminal signals in M channels, perform echo filtering on the receiving terminal signals in M channels under the control of update amounts outputted by the filtering control unit to obtain filtered receiving terminal signals in M channels, and subtract the filtered receiving terminal signals in M channels from the sending terminal signal to obtain a system output signal in which receiving terminal echoes have been cancelled; and the filtering control unit is configured to buffer the receiving terminal signals in M channels, calculate a decorrelation matrix according to each of the receiving terminal signals in M channels that are buffered within a preset length, decompose the buffered receiving terminal signals in M channels into decorrelated receiving terminal signals in M channels by means of the decorrelation matrix, calculate the update amounts of echo filters in the echo filtering unit according to the decorrelation matrix, the decorrelated receiving terminal signals in M channels and the system output signal fed back from the echo filtering unit, and output the update amounts to the echo filtering unit.

The embodiments of the present invention achieve the following benefits: by performing echo filtering on receiving terminal signals in M channels by means of echo filters to obtain filtered receiving terminal signals in M channels and subtracting the filtered receiving terminal signals in M channels from a sending terminal signal to obtain a system output signal in which receiving terminal echoes have been cancelled, the present invention can effectively cancel echoes caused by two or more receiving terminals from the sending terminal signal; at the same time, by calculating a decorrelation matrix according to the receiving terminal signals in M channels that are buffered within each preset time length, performing decorrelation decomposition on the receiving terminal signals by means of the decorrelation matrix, the present invention can eliminate the need of using the predistortion approach to reduce the correlation between the receiving terminal signals as in the prior art, so the replayed sound quality of the receiving terminals will not be affected; and this way of calculating the update amounts of the echo filters in real time is suitable for use in situations under which the correlation between a plurality of receiving terminal signals is variable.

DETAILED DESCRIPTION OF THE INVENTION

The present invention has the following core idea: performing echo filtering on receiving terminal signals in M channels by means of echo filters to obtain filtered receiving terminal signals in M channels, and subtracting the filtered receiving terminal signals in M channels from a sending terminal signal to obtain a system output signal in which receiving terminal echoes have been cancelled; and updating update amounts of the echo filters in real time and, specifically, calculating the update amounts of the echo filters as follows according to the receiving terminal signals in M channels that are buffered in buffers:

calculating a decorrelation matrix according to the receiving terminal signals in M channels that are buffered within each preset time length, decomposing the buffered receiving terminal signals in M channels into decorrelated receiving terminal signals in M channels by means of the decorrelation matrix, and calculating the update amounts of the echo filters according to the decorrelation matrix, the decorrelated receiving terminal signals in M channels and the system output signal that is fed back.

To make the objective, technical solutions and advantages of the present invention clearer, the embodiments of the present invention will be further detailed with reference to the attached drawings hereinbelow.

Figure 1:
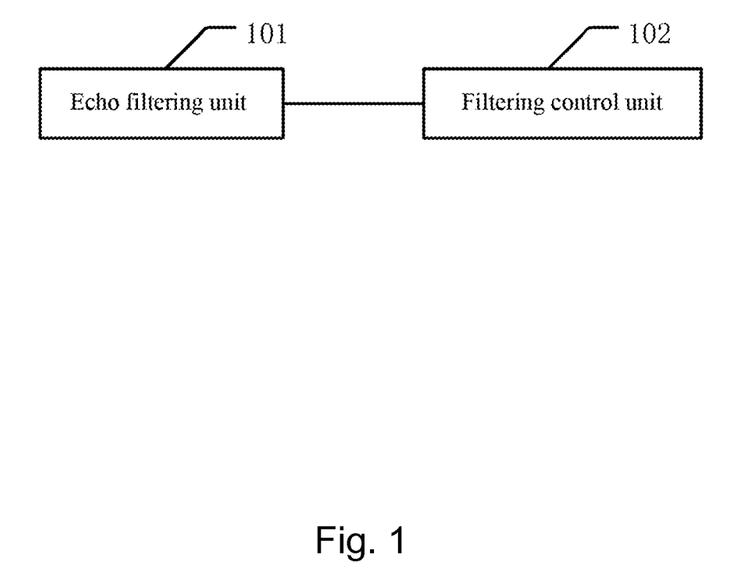
FIG. 1 is a structural diagram of a system for accomplishing a multi-receiving terminal echo cancellation method according to an embodiment of the present invention.

FIG. 1 is a structural diagram of a system for accomplishing a multi-receiving terminal echo cancellation method according to an embodiment of the present invention. As shown in FIG. 1, the system comprises an echo filtering unit 101 and a filtering control unit 102.

The echo filtering unit 101 is configured to receive a sending terminal signal and receiving terminal signals in M channels, perform echo filtering on the receiving terminal signals in M channels under the control of update amounts outputted by the filtering control unit 102 to obtain filtered receiving terminal signals in M channels, and subtract the filtered receiving terminal signals in M channels from the sending terminal signal to obtain a system output signal in which receiving terminal echoes have been cancelled; and The filtering control unit 102 is configured to buffer the receiving terminal signals in M channels, and each time after buffering the receiving terminal signals in M channels of a preset length, calculate a decorrelation matrix according to the buffered receiving terminal signals in M channels, decompose the buffered receiving terminal signals in M channels into decorrelated receiving terminal signals in M channels by means of the decorrelation matrix, calculate update amounts of echo filters according to the decorrelation matrix, the decorrelated receiving terminal signals in M channels and the system output signal fed back from the echo filtering unit, and output the update amounts to the echo filtering unit 101.

The multi-receiving terminal echo cancellation system of the present invention is connected between a sending terminal and receiving terminals, and the sending terminal signal d and the M receiving terminal signals $x=[x_1, x_2, \ldots, x_M]$ are system inputs. By comparing the receiving terminal signals with the sending terminal signal in real time, echo paths of the respective receiving terminal signals are simulated by means of a plurality of adaptive filters to construct accurate echo path filters and echo signals. Then, the echo signals are cancelled from the sending terminal signal, and the echo-cancelled signal is transmitted to a remote end of the voice communication. The system may have a time-domain processing mode, a frequency-domain processing mode, other transformation-domain processing modes, or a mixed time-domain/frequency-domain processing mode. These modes will be introduced, respectively, hereinbelow.

Figure 2:
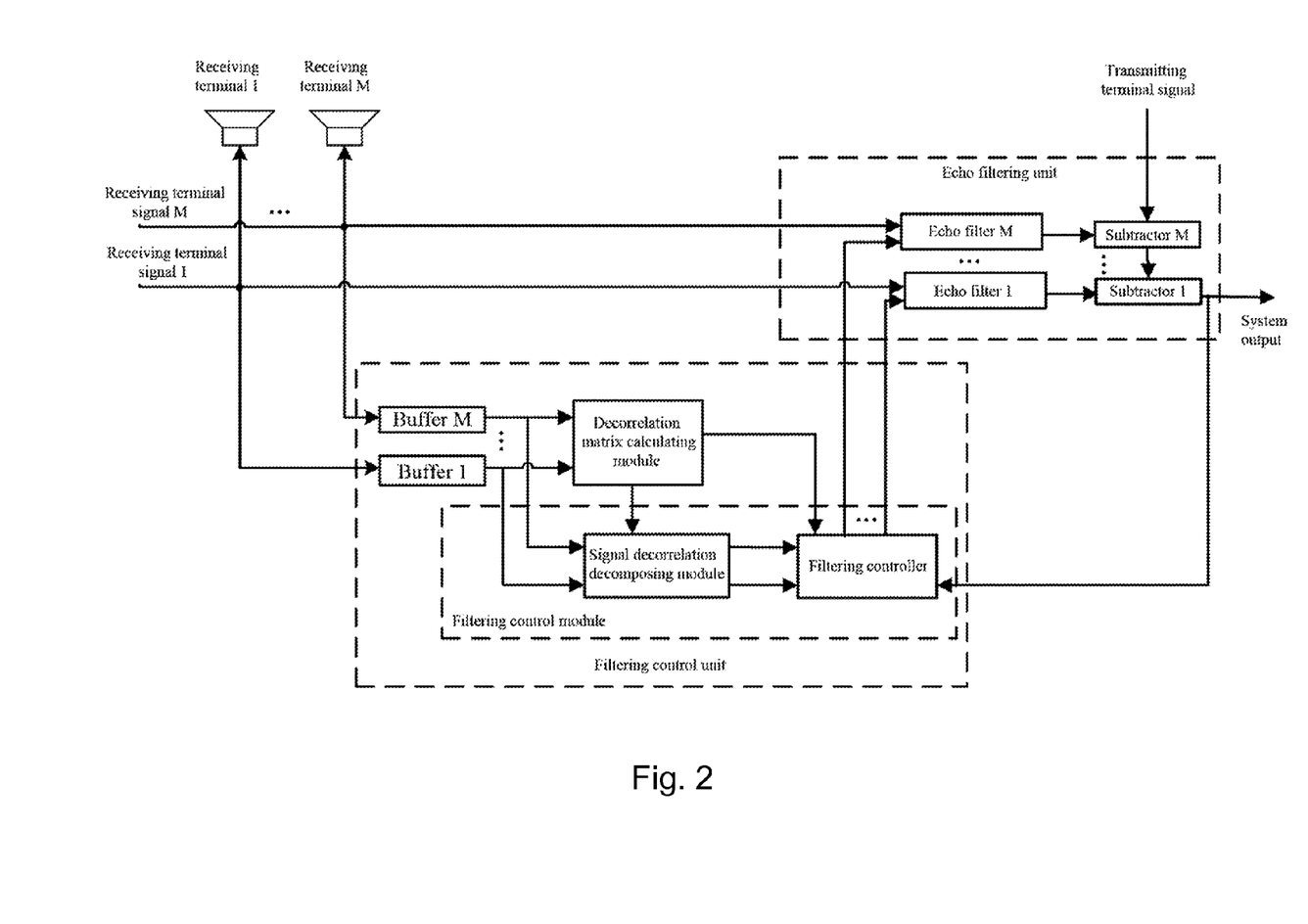
FIG. 2 is a structural diagram of a system for accomplishing a time-domain multi-receiving terminal echo cancellation method according to an embodiment of the present invention.

FIG. 2 is a structural diagram of a system for accomplishing a time-domain multi-receiving terminal echo cancellation method according to an embodiment of the present invention. The system as shown in FIG. 2 can be used in echo cancellation of a plurality of receiving channels. To avoid interference between the receiving channel signals when the echo paths are estimated in the echo cancellation, the original receiving terminal signals are decomposed by means of the decorrelation matrix into receiving terminal signals with a reduced correlation therebetween, which are then transmitted into the echo filters to estimate the echo signals and update the echo filters. Coefficients of the decorrelation matrix are determined by the correlation between the original receiving terminal signals. The decorrelation matrix is calculated in real time. When the correlation between the receiving terminal signals is changed, the decorrelation matrix is also adjusted correspondingly to ensure a good decorrelation decomposition effect so that echo cancellers operate normally to ensure the echo cancellation effect.

Referring to FIG. 2, in the time-domain multi-receiving terminal echo cancellation system the echo filtering unit comprises M echo filters and M subtractors connected in series;

the filtering control unit comprises M buffers with a preset length, one decorrelation matrix calculating module and one filtering control module, and the filtering control module comprises one signal decorrelation decomposing module and one filtering controller;

the M echo filters are configured to receive the receiving terminal signals in M channels in one-to-one correspondence, perform echo filtering on the receiving terminal signals in M channels, respectively, under the control of the update amounts outputted by the filtering control unit to obtain filtered receiving terminal signals in M channels, and output the filtered receiving terminal signals in M channels to the M subtractors connected in series in one-to-one correspondence;

The first subtractor (i.e., the subtractor M in FIG. 2) of the M subtractors connected in series receives the sending terminal signal, subtracts the received filtered receiving terminal signal from the sending terminal signal and then outputs the resulted signal to a next stage subtractor; each of the subsequent subtractors subtracts the received filtered receiving terminal signal from the signal outputted by the previous stage subtractor and then outputs the resulted signal; and an output of the last subtractor (i.e., the subtractor 1 in FIG. 2) is a system output signal in which receiving terminal echoes have been cancelled;

the M buffers with a preset length are configured to store the input data to form a data frame; and here, the M buffers with a preset length are configured to buffer the receiving terminal signals in M channels, respectively, and output the buffered receiving terminal signals in M channels of the preset length to the decorrelation matrix calculating module and the signal decorrelation decomposing module;

the decorrelation matrix calculating module is configured to calculate a decorrelation matrix according to the received receiving terminal signals in M channels of the preset length and output the decorrelation matrix to the signal decorrelation decomposing module and the filtering controller;

the signal decorrelation decomposing module is configured to decompose the received receiving terminal signals in M channels of the preset length into decorrelated receiving terminal signals in M channels according to the received decorrelation matrix and then output the decorrelated receiving terminal signals in M channels to the filtering controller; and the filtering controller is configured to calculate the update amounts of the M echo filters according to the received decorrelation matrix, the decorrelated receiving terminal signals in M channels and the system output signal fed back from the $M^{th}$ subtractor and output the update amounts to the corresponding echo filters.

In FIG. 2, the echo filters accomplish the echo filtering, the buffers store the input data to form a data frame, and the filtering control unit calculates deviations of the current echo filters and updates the echo filters. The receiving terminal signals pass through the echo filters and are then formed into echo estimation signals, which are subtracted from the sending terminal signal to obtain a current system output. The current system output and the receiving terminal signals pass through the filtering control unit, in which whether the echo filters need to be updated is determined. If the echo filters need to be updated, then the update amounts of the echo filters are calculated and then outputted to the echo filters for update.

Hereinbelow, calculation method of individual portions in FIG. 2 will be described specifically.

A calculation formula of each of the echo filters is: echo=x*h; and a calculation formula of each of the subtractor portions is: y=d−echo, wherein the sending terminal signal d and the receiving terminal signals in M channels x=[$x_1, x_2, \ldots, x_M$] are system inputs, h represents a filter function, and y represents a system output.

In each of the buffers, suppose that a current time point is n, then the data frame formed is $x(n-L_D+1), \ldots x(n)$, wherein $L_D$ represents a length of the buffer.

Firstly, calculations in the decorrelation matrix calculating module, the signal decorrelation decomposing module and the filtering controller will be described by taking two receiving terminals as an example (i.e., M=2). The receiving terminal signals $x_1$ and $x_2$ of two channels are highly correlated with each other.

In the decorrelation matrix calculating module, the decorrelation matrix can be derived by firstly calculating the correlation factor $c_{1,2}$ of the two receiving terminal signals $x_1$ and $x_2$. The decorrelation matrix De is:

$$De = \begin{bmatrix} 1 & -c_{1,2} \\ 0 & 1 \end{bmatrix}.$$

A calculation formula of the correlation factor is:

$$c_{1,2} = \frac{\sum_{n=1}^{L_D} x_1(n) x_2(n)}{\sum_{n=1}^{L_D} x_1^2(n)},$$

wherein $L_D$ represents a length of each of the data buffers.

The decorrelation decomposing result in the signal decorrelation decomposing module is: x'=xDe; i.e., $x_1'=x_1, x_2'=x_2-c_{1,2}x_1$.

The correlation between the signals $x_1'$ and $x_2'$ is lower than that between the signals $x_1$ and $x_2$. Thus, decorrelation decomposition of the receiving terminal signals is achieved in the signal decorrelation decomposing module.

In the filtering controller, the update amounts of the echo filters are calculated as follows:

$$\Delta h_i'(l) = \frac{x_i'(n-l+1)y(n)}{\frac{1}{L_D}\sum_{n=1}^{L_D} x_i'^2(n)}, i = 1, 2$$

$$\Delta h_i(l) = De\Delta h_i'(l)$$

wherein $\Delta h_i(l)$ represents the update amount of the echo filter corresponding to the receiving terminal signal of the $i^{th}$ channel, l represents a sequence number of the update amount of the echo filter, y(n) represents the system output signal that is fed back, and $x_i'(n)$ represents the $n^{th}$ sample data of the $i^{th}$ channel's signal of the decorrelated receiving terminal signals in M channels.

The aforesaid decorrelation decomposition manner can be extended to the situations of receiving terminal signals in M channels (M>2). In the case of receiving terminal signals in M channels, the decorrelation decomposition can be divided into M−1 steps, and each step is executed to reduce the correlation between some channel and other channels. Through at most M−1 steps of operations, the decorrelation decomposition of all the channels can be accomplished, and the decorrelation matrix De can also be obtained.

Suppose that an initial input of the iterative operation is one signal matrix $x_{(0)}'$ with $L_D$ rows and M columns (which represents signals of M channels and $L_D$ sampling points). In the first iterative step, the output is a signal matrix $x_{(1)}'$ and a matrix $De_1$; analogically, in the $i^{th}$ iterative step, the input is a signal matrix $x_{(i-1)}'$ and the output is a signal matrix $x_{(i)}'$ and a matrix $De_i$; and finally, after the $(M-1)^{th}$ iterative step, an output signal matrix $x_{(M-1)}'$ and a matrix $De_{M-1}$ are obtained. Thus, the output signal matrix $x_{(M-1)}'$ is a decorrelation decomposition signal, and the decomposition matrix De can be obtained through synthesis of the matrices $De_1, \ldots, De_{M-1}$.

Figure 3:
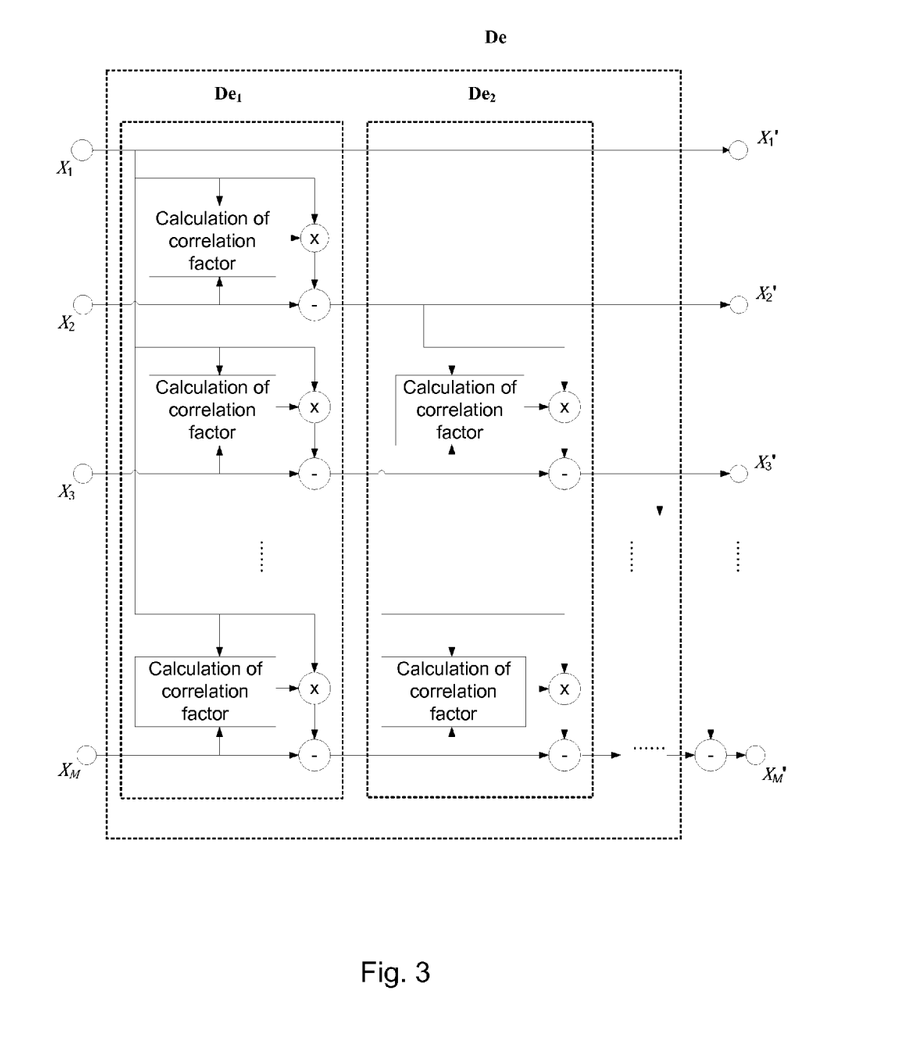
FIG. 3 is a schematic logic diagram illustrating a decorrelation decomposing operation performed on a plurality of receiving terminal signals according to an embodiment of the present invention.

FIG. 3 is a schematic logic diagram illustrating a decorrelation decomposing operation performed on a plurality of receiving terminal signals according to an embodiment of the present invention. Referring to FIG. 3, the process of performing an (M-1)-step iterative operation is as follows:

The initial input of the iterative operation is one signal matrix $x_{(0)}'$ with $L_D$ rows and M columns that is constituted by the buffered receiving terminal signals in M channels, wherein:

$$x'_{(0)} = [x'_{1(0)} \ x'_{2(0)} \ \ldots \ x'_{i(0)} \ \ldots \ x'_{M(0)}],$$

$$x'_{i(0)} = x_i = \begin{bmatrix} x_i(1) \\ x_i(2) \\ \vdots \\ x_i(L_D) \end{bmatrix}$$

$x_i$ represents the $i^{th}$ channel's receiving terminal signal buffered within the preset time length, which has a length of $L_D$, and $1 \leq i \leq M$;

The first step is to reduce the correlation between the first channel and the other channels, that is, to calculate correlation factors $c_{1,2}, \ldots c_{1,M}$ between the first channel $x_{1(0)}'$ and the other channels $x_{2(0)}', \ldots x_{M(0)}'$;

then a decorrelation matrix $De_1$ is calculated in the first iterative step:

$$De_1 = \begin{bmatrix} 1 & -c_{1,2} & \ldots & -c_{1,M} \\ & 1 & & \\ & & \ddots & 0 \\ 0 & & & 1 \end{bmatrix}$$

wherein the correlation factors are calculated according to the following formula:

$$c_{1,j} = \frac{\sum_{n=1}^{L_D} x'_{1(0)}(n) x'_{j(0)}(n)}{\sum_{n=1}^{L_D} [x'_{1(0)}(n)]^2}, 1 < j \leq M;$$

then the calculation result of the first iterative step is: $x_{(1)}'=x_{(0)}'De_1$ $$x_{(1)}'=[x_{1(1)}' x_{2(1)}' \ldots x_{i(1)}' \ldots x_{M(1)}']$$

analogically, the $i^{th}$ step is to calculate correlation factors $c_{i,i+1}, \ldots c_{i,M}$ between the $i^{th}$ channel $x_{i(i)}'$ and the other channels $x_{i+1(i)}', x_{i+2(i)}', \ldots x_{M(i)}'$;

then a decorrelation matrix $De_i$ is calculated in the $i^{th}$ iterative step:

$$De_i = \begin{bmatrix} I_{i-1} & & & 0 \\ & 1 & -c_{i,i+1} & -c_{i,M} \\ & & 1 & \\ & & & \ddots & 0 \\ 0 & & & & 1 \end{bmatrix}$$

wherein the correlation factors are:

$$c_{i,j} = \frac{\sum_{n=1}^{L_D} x'_{i(i-1)}(n) x'_{j(i-1)}(n)}{\sum_{n=1}^{L_D} [x'_{i(i-1)}(n)]^2}, M-1 \geq i > 1, M \geq j > i;$$

the calculation result of the $i^{th}$ iterative step is: $x_{(i)}'=x_{(i-1)}'De_i$ $$x_{(i)}'=[x_{1(i)}' x_{2(i)}' \ldots x_{i(i)}' \ldots x_{M(i)}']$$

through the (M-1)-step iterative operation, the final decorrelation matrix De is obtained: $De=\Pi_{i=1}^{M-1} De_i$; and the buffered receiving terminal signals in M channels are decomposed into decorrelated signals in M channels by means of the decorrelation matrix De through calculation of $x'=xDe$;

wherein $x=[x_1, x_2 \ldots x_i \ldots x_M]$, and the M columns of signals in the signal matrix $x'$ are the final decorrelated receiving terminal signals in M channels.

Here, in fact, $x'=x_{(M-1)}'=x_{(M-2)}'De_{M-1}$.

According to the decorrelation matrix, the decorrelated signals in M channels and the system output signal that is fed back, update amounts of echo filters are calculated by:

calculating $$\Delta h_i'(l) = \frac{x_i'(n-l+1)y(n)}{\frac{1}{L_D}\sum_{n=1}^{L_D} x_i'^2(n)}, i=1, 2, \ldots M$$

$$\Delta h_i(l) = De\Delta h_i'(l)$$

wherein $\Delta h_i(l)$ represents the update amount of the echo filter corresponding to the $i^{th}$ channel's receiving terminal signal, l represents a sequence number of the update amount of the echo filter, y(n) represents the system output signal that is fed back, and $x_i'(n)$ represents the $n^{th}$ sample data of the $i^{th}$ channel's signal of the decorrelated receiving terminal signals in M channels.

Figure 4:
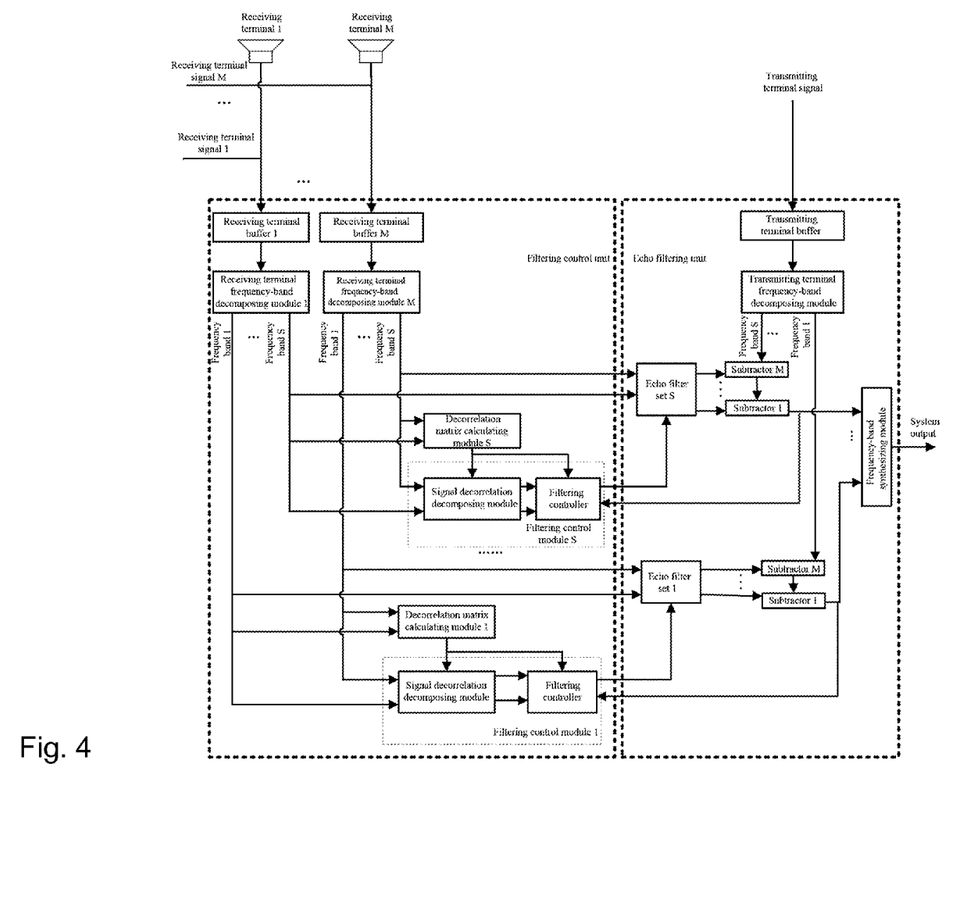
FIG. 4 is a structural diagram of a system for accomplishing a transformation-domain multi-receiving terminal echo cancellation method according to an embodiment of the present invention.

FIG. 4 is a structural diagram of a system for accomplishing a transformation-domain multi-receiving terminal echo cancellation method according to an embodiment of the present invention. Referring to FIG. 4, in the transformation-domain multi-receiving terminal echo cancellation system an echo filtering unit comprises one sending terminal buffer, one sending terminal frequency-band decomposing module, S echo filter sets, S subtractor sets and one frequency-band synthesizing module, each of the subtractor sets consists of M subtractors connected in series, and each of the echo filter sets comprises M echo filters; and a filtering control unit comprises M receiving terminal buffers, M receiving terminal frequency-band decomposing modules, S decorrelation matrix calculating modules and S filtering control modules, and each of the filtering control modules comprises one signal decorrelation decomposing module and one filtering controller, wherein the sending terminal buffer is configured to buffer the sending terminal signal, and each time after buffering the sending terminal signal of a preset length, output the buffered sending terminal signal of the preset length to the sending terminal frequency-band decomposing module;

the sending terminal frequency-band decomposing module is configured to decompose each sending terminal signal of the preset length from the sending terminal buffer into sending frequency-division signals within S frequency bands in a transformation domain and then output the sending frequency-division signals to the S subtractor sets, respectively;

the M receiving terminal buffers are in one-to-one correspondence to the M receiving terminal signals, and the M receiving terminal frequency-band decomposing modules are in one-to-one correspondence to the M receiving terminal buffers;

each of the receiving terminal buffers is configured to buffer the corresponding receiving terminal signal, and each time after buffering the receiving terminal signal of a preset length, output the receiving terminal signal of the preset length to the corresponding receiving terminal frequency-band decomposing module;

each of the receiving terminal frequency-band decomposing modules is configured to decompose each receiving terminal signal of the preset length from the corresponding receiving terminal buffer into receiving terminal frequency-division signals within S frequency bands in the transformation domain and then output the receiving terminal frequency-division signals to the S echo filter sets, the S decorrelation matrix calculating modules and the signal decorrelation decomposing modules of the S filtering control modules, respectively;

the S decorrelation matrix calculating modules, the S filtering control modules, the S echo filter sets and the S subtractor sets are all in one-to-one correspondence to the S frequency bands;

each of the decorrelation matrix calculating modules is configured to calculate a decorrelation matrix according to the received M receiving frequency-division signals and output the decorrelation matrix to the corresponding signal decorrelation decomposing module and filtering controller;

each of the signal decorrelation decomposing modules is configured to decompose the received M receiving frequency-division signals into decorrelated receiving frequency-division signals in M channels according to the received decorrelation matrix and then output the decorrelated receiving frequency-division signals in M channels to the corresponding filtering controller;

each of the filtering controllers is configured to calculate the update amounts of the corresponding echo filters according to the received decorrelation matrix, the decorrelated receiving frequency-division signals in M channels and the echo-cancelled sending frequency-division signal fed back from the corresponding subtractor set and output the update amounts to the corresponding echo filter set;

each of the echo filter sets is configured to perform echo filtering on the received M receiving frequency-division signals under the control of the update amounts outputted by the filtering controller in the corresponding filtering control module and output the M filtered receiving frequency-division signals to the corresponding subtractor set;

each of the subtractor sets is configured to receive the sending frequency-division signal and the M filtered receiving frequency-division signals within the corresponding frequency band, subtract the M filtered receiving frequency-division signals sequentially from the sending frequency-division signal to obtain an echo-cancelled sending frequency-division signal, and then output the echo-cancelled sending frequency-division signal to the frequency-band synthesizing module and meanwhile feed the echo-cancelled sending frequency-division signal back to the filtering controller in the corresponding filtering control module; and the frequency-band synthesizing module is configured to perform frequency-time synthesizing processing on the echo-cancelled sending frequency-division signals within the S frequency bands from the S subtractor sets to obtain a system output signal.

As can be seen from the above description, suppose that the signals may be divided into S frequency bands in the transformation domain (e.g., the frequency domain), then each channel's receiving terminal signal can be decomposed into S frequency-division signals, and the decorrelation matrices $De^1, \ldots, De^S$ and the decomposition signals as well as the update amounts of the filters can be calculated independently in each of the frequency bands.

Hereinbelow, the calculation method of the individual portions in FIG. 4 will be described specifically.

A time-domain signal enters into a data buffer and is formed into a data frame $[x_i(n-L_D+1), \ldots, x_i(n-1), x_i(n)]$ with a data frame length of $L_D$. Then, a sending data frame is $[d(n-L_D+1), \ldots, d(n-1), d(n)]$; and a receiving data frame is $[x_i(n-L_D+1), \ldots, x_i(n-1), x_i(n)]$, $1 \leq i \leq M$, wherein M represents the number of receiving channels. The data frame enters into a frequency-band decomposing module and generates a frequency-division signal.

Specifically, for the data frame of the $i^{th}$ channel's receiving terminal signal, a receiving frequency-division signal $X_i(0), X_i(W_s), \ldots, X_i(2\pi-W_s)$, $1 \leq i \leq M$ with a length of $L_D$ is obtained; and a sending frequency-division signal $D(0), D(W_s), \ldots, D(2\pi-W_s)$ is obtained, wherein $$W_s = \frac{2\pi}{L_D}.$$

Frequency division may be accomplished in many ways, for example, through Fourier transformation, subband transformation, cosine transformation or other transformation-domain algorithms. Taking the Fourier transformation as an example, the calculation process is as follows:

$$X_i(k) = \sum_{t=1}^{L_D} x_i(n - L_D + t)\exp(-jW_s tk), 0 < k \leq L_D$$

$$D(k) = \sum_{t=1}^{L_D} d(n - L_D + t)\exp(-jW_s tk), 0 < k \leq L_D.$$

The receiving frequency-division signals enter into the echo filters and generate an echo signal, as shown by the following formula:

$$\text{Echo}(k) = \sum_{i=1}^{L_D} X_i(k)H_i(k).$$

An echo-cancelled signal is obtained by subtracting an echo frequency-division signal from the sending frequency-division signal:

$$Y(k)=D(k)-Echo(k).$$

The frequency-band synthesizing module performs frequency-time synthesis to obtain a system output as shown by the following formula, wherein the frequency-time synthesis is still illustrated by taking the Fourier transformation as an example:

$$y(n) = \sum_{k=1}^{L_D} Y(k)\exp(jW_s nk).$$

In each of the decorrelation matrix calculating modules, the decorrelation matrix of the frequency band is calculated independently. When there are two receiving terminals (i.e., M=2), the decorrelation matrix $De(k)$ of the $k^{th}$ frequency band is:

$$De(k) = \begin{bmatrix} 1 & -c_{1,2}(k) \\ 0 & 1 \end{bmatrix},$$

wherein $c_{1,2}(k)$ is the correlation factor of $X_1(k)$ and $X_2(k)$, and is calculated according to the following formula:

$$c_{1,2}(k) = \frac{\sum_{l=-L_w}^{l=L_w} |X_1(\mathrm{mod}(k+l, L_D))^2|}{\sum_{l=-L_w}^{l=L_w} X_2(\mathrm{mod}(k+l, L_D))\mathrm{conj}(X_1(\mathrm{mod}(k+l, L_D)))},$$

wherein $L_w$ represents a specified length and generally has a value selected from 3 to 10, conj represents a conjugate operation, and mod represents a modular operation.

Then, $X'(k)=X(k)De(k)$ is calculated in the signal decorrelation decomposing module, wherein $X(k)=[X_1(k), X_2(k)]$, and the two signals in the signal matrix $X'(k)$ are two decorrelated receiving frequency-division signals of the $k^{th}$ frequency band.

The two decorrelated receiving frequency-division signals enter into the filtering controller, and the update amount of the filter corresponding to the $i^{th}$ receiving terminal signal and the $k^{th}$ frequency band is calculated as follows:

$$\Delta H_i(k) = De(k)\Delta H_i'(k),$$

wherein $$\Delta H_i'(k) = \frac{X_i'(k)Y(k)}{\frac{1}{2L_w+1}\sum_{l=-L_w}^{l=L_w}|X_i'(\mathrm{mod}(k+l, L_D))^2|}, i=1,2.$$

In a case of receiving terminal signals in M channels (M>2), the decorrelation decomposition can be accomplished through an iterative operation for each of the frequency bands. Through at most M−1 iterative steps, the decorrelation decomposition of all the M channels can be accomplished and the decorrelation matrix can be obtained. The steps are as follows.

For the $k^{th}$ frequency band, the initial input of the iterative operation is a signal matrix $X_{(0)}'(k)$ with 1 row and M columns, and one signal matrix $X_{(i)}'(k)$ with 1 row and M columns and a decomposition matrix $De_{(i)}(k)$ can be obtained in each iterative step. M represents the number of the receiving channels.

Then, for the $k^{th}$ frequency band with $1 \leq k \leq S$, the process of performing an (M−1)-step iterative operation is as follows:

the initial input of the iterative operation is one signal matrix $X_{(0)}'(k)$ with 1 row and M columns, wherein $$X_{(0)}'(k)=[X_{1(0)}'(k)\, X_{2(0)}'(k)\ldots X_{i(0)}'(k)\ldots X_{M(0)}'(k)]$$

$$X_{i(0)}'(k)=X_i(k), i=1,2,\ldots M$$

$X_i(k)$ represents a receiving frequency-division signal of the $i^{th}$ channel's receiving terminal signal within the $k^{th}$ frequency band;

the first step is to calculate correlation factors between $X_{1(0)}(k)$ and $X_{2(0)}(k), \ldots, X_{M(0)}(k)$ and a decorrelation sub-matrix $De_{(1)}(k)$:

the decorrelation matrix $De_{(1)}(k)$ is calculated in the first iterative step, $$De_{(1)}(k) = \begin{bmatrix} 1 & -c_{1,2}(k) & \cdots & -c_{1,M}(k) \\ & 1 & & \\ & & \ddots & 0 \\ 0 & & & 1 \end{bmatrix}$$

wherein $$c_{1,j}(k) = \frac{\sum_{l=-L_w}^{l=L_w} |X_{1(0)}'(\mathrm{mod}(k+l, L_D))^2|}{\sum_{l=-L_w}^{l=L_w} X_{1(0)}'(\mathrm{mod}(k+l, L_D))\mathrm{conj}(X_{j(0)}'(\mathrm{mod}(k+l, L_D)))},$$

$$1 < j \leq M;$$

$L_w$ represents a specified length and has a value selected from 3 to 10, conj represents a conjugate operation, mod represents a modular operation, and $L_D$ represents a data length buffered within each preset time length;

then, the calculation result of the first iterative step is:

$$X_{(1)}'(k)=X_{(0)}'(k)De_{(1)}(k)$$

$$X_{(1)}'(k)=[X_{1(1)}'(k)\, X_{2(1)}'(k)\ldots X_{i(1)}'(k)\ldots X_{M(1)}'(k)];$$

analogically, the $i^{th}$ iterative step is to calculate correlation factors between $X_{i(i)}'(k)$ and $X_{i+1(i)}'(k), \ldots, X_{M(i)}'(k)$ and a decorrelation sub-matrix:

the decorrelation matrix $De_{(i)}(k)$ is calculated in the $i^{th}$ iterative step, $$De_{(1)}(k) = \begin{bmatrix} I_{i-1} & & & 0 \\ & 1 & -c_{i,i+1}(k) & -c_{i,M}(k) \\ & & 1 & \\ & & & \ddots & 0 \\ 0 & & & & 1 \end{bmatrix}$$

-continued wherein $$c_{1,j}(k) = \frac{\sum_{l=-L_w}^{l=L_w} |X'_{i(i)}(\mathrm{mod}(k+l, L_D))^2|}{\sum_{l=-L_w}^{l=L_w} X'_{i(i)}(\mathrm{mod}(k+l, L_D))conj(X'_{j(i)}(\mathrm{mod}(k+l, L_D)))},$$

$$1 < i \leq M-1, M \geq j > i$$

the calculation result of the $i^{th}$ iterative step is: $X'_{(i)}(k) = X'_{(i-1)}(k) De_{(i)}(k)$ $$X_{(i)}'(k) = [X_{1(i)}'(k) \, X_{2(i)}'(k) \ldots X_{i(i)}'(k) \ldots X_{M(i)}'(k)];$$

through the (M−1)-step iterative operation, the final decorrelation matrix De(k) of the $k^{th}$ frequency band is obtained: $De(k) = \Pi_{i=1}^{M-1} De_{(i)}(k)$; and X'(k)=X(k)De(k) is calculated in the signal decorrelation decomposing module;

wherein $X(k) = [X_1(k) X_2(k) \ldots X_i(k) \ldots X_M(k)]$, and the M signals in the signal matrix X'(k) are the M decorrelated receiving frequency-division signals of the $k^{th}$ frequency band.

Actually, it can be seen that $X'(k) = X'_{(M-1)}(k) = X'_{(M-2)}(k) De_{(M-1)}(k)$.

In the filtering controller, the update amount of each of the echo filters of the current frequency band (the $k^{th}$ frequency band) is calculated as follows:

$$\Delta H_i'(k) = \frac{X_i'(k)Y(k)}{\frac{1}{2L_w+1}\sum_{l=-L_w}^{l=L_w} |X_i'(\mathrm{mod}(k+l, L_D))^2|}, i = 1, 2, \ldots M$$

$$\Delta H_i(k) = De(k)\Delta H_i'(k),$$

wherein $\Delta H_i(k)$ represents the update amount of the echo filter corresponding to the $i^{th}$ receiving terminal frequency-division signal within the $k^{th}$ frequency band, and Y(k) represents the echo-cancelled sending terminal frequency-division signal within the $k^{th}$ frequency band that is fed back.

Figure 5:
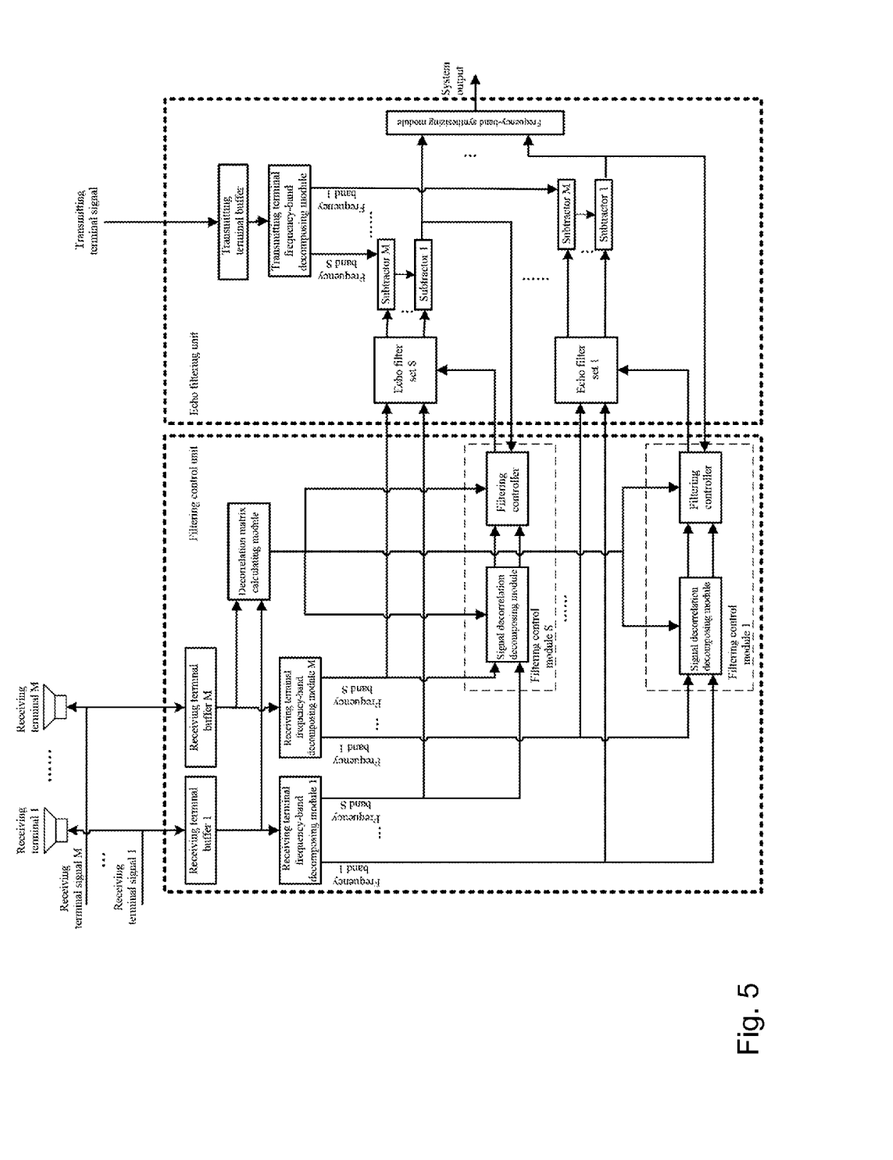
FIG. 5 is a structural diagram of a system for accomplishing a mixed time-domain/transformation-domain multi-receiving terminal echo cancellation method according to an embodiment of the present invention.

FIG. 5 is a structural diagram of a system for accomplishing a mixed time-domain/transformation-domain multi-receiving terminal echo cancellation method according to an embodiment of the present invention. Referring to FIG. 5, in the mixed-domain multi-receiving terminal echo cancellation system an echo filtering unit comprises one sending terminal buffer, one sending terminal frequency-band decomposing module, S echo filter sets, S subtractor sets and one frequency-band synthesizing module, each of the subtractor sets consists of M subtractors connected in series, and each of the echo filter sets comprises M echo filters; and a filtering control unit comprises M receiving terminal buffers, one decorrelation matrix calculating module, M receiving terminal frequency-band decomposing modules and S filtering control modules, and each of the filtering control modules comprises one signal decorrelation decomposing module and one filtering controller, wherein the sending terminal buffer is configured to buffer the sending terminal signal, and each time after buffering the sending terminal signal of a preset length, output the sending terminal signal of the preset length to the sending terminal frequency-band decomposing module;

the sending terminal frequency-band decomposing module is configured to decompose each sending terminal signal of the preset length from the sending terminal buffer into sending frequency-division signals within S frequency bands in a transformation domain and then output the sending frequency-division signals to the S subtractor sets, respectively;

the M receiving terminal buffers are in one-to-one correspondence to M receiving terminal signals, and the M receiving terminal frequency-band decomposing modules are in one-to-one correspondence to the M receiving terminal buffers;

each of the receiving terminal buffers is configured to buffer the corresponding receiving terminal signal, and each time after buffering the receiving terminal signal of a preset length, output the receiving terminal signal of the preset length to the corresponding receiving terminal frequency-band decomposing module and the decorrelation matrix calculating module;

each of the receiving terminal frequency-band decomposing modules is configured to decompose each receiving terminal signal of the preset length from the corresponding receiving terminal buffer into receiving frequency-division signals within S frequency bands in the transformation domain and then output the receiving frequency-division signals to the S echo filter sets and the signal decorrelation decomposing modules of the S filtering control modules, respectively;

the decorrelation matrix calculating module is configured to calculate a decorrelation matrix according to the receiving terminal signals in M channels of the preset length received each time and output the decorrelation matrix to the signal decorrelation decomposing modules of the S filtering control modules and the filtering controllers;

the S filtering control modules, the S echo filter sets and the S subtractor sets are in one-to-one correspondence to the S frequency bands;

each of the signal decorrelation decomposing modules is configured to decompose the received M receiving frequency-division signals into decorrelated receiving frequency-division signals in M channels according to the received decorrelation matrix and then output the decorrelated receiving frequency-division signals in M channels to the corresponding filtering controller;

each of the filtering controllers is configured to calculate the update amounts of the corresponding echo filters according to the received decorrelation matrix, the decorrelated receiving frequency-division signals in M channels and the echo-cancelled sending frequency-division signal fed back from the corresponding subtractor set and output the update amounts to the corresponding echo filter set;

each of the echo filter sets is configured to perform echo filtering on the received M receiving frequency-division signals under the control of the update amounts outputted by the filtering controller in the corresponding filtering control module and output the M filtered receiving frequency-division signals to the corresponding subtractor set;

each of the subtractor sets is configured to receive the sending frequency-division signal and the M filtered receiving frequency-division signals within the corresponding frequency band, subtract the M filtered receiving frequency-division signals sequentially from the sending frequency-division signal to obtain an echo-cancelled sending frequency-division signal, and then output the echo-cancelled sending frequency-division signal to the frequency-band synthesizing module and meanwhile feed the echo-cancelled sending frequency-division signal back to the filtering controller in the corresponding filtering control module; and the frequency-band synthesizing module is configured to perform frequency-time synthesizing processing on the echo-cancelled sending frequency-division signals within the S frequency bands from the S subtractor sets to obtain a system output signal.

As can be seen, in the system as shown in FIG. 5, the calculation of the decorrelation matrix is accomplished in the time domain and in detail the calculation manner is the same as that of the decorrelation matrix in FIG. 2. Through the (M−1)-step iterative operation, the final time-domain decorrelation matrix De is obtained, and the specific calculating process will not be repetitively described herein.

On the other hand, the decorrelation decomposition of the receiving terminal signals is accomplished in the transformation domain, but the matrix used is the time-domain decorrelation matrix De. That is, within each of the frequency bands, the receiving frequency-division signals in M channels of the frequency band are decomposed into the decorrelated receiving frequency-division signals in M channels of the frequency band by means of the same time-domain decorrelation matrix De. For example, for the $k^{th}$ frequency band with $1 \leq k \leq S$, a matrix $X'(k)=X(k)De$ is calculated, wherein $X(k)=[X_1(k)\ X_2(k)\ \ldots\ X_i(k)\ \ldots\ X_M(k)]$, $X_i(k)$ represents a receiving frequency-division signal of the $i^{th}$ channel's receiving terminal signal within the $k^{th}$ frequency band, and the M signals in the signal matrix $X'(k)$ are the final decorrelated receiving frequency-division signals in M channels within the $k^{th}$ frequency band.

Then, the update amount of each of the echo filters is calculated as follows:

$$\Delta H_i'(k) = \frac{X_i'(k)Y(k)}{\frac{1}{2L_w+1}\sum_{l=-L_w}^{l=L_w}|X_i'(\mathrm{mod}(k+l, L_D))^2|}, i = 1, 2, \ldots M$$

$$\Delta H_i(k) = De(k)\Delta H_i'(k),$$

wherein De represents the decorrelation matrix in the time domain, $\Delta H_i(k)$ represents the update amount of the echo filter corresponding to the $i^{th}$ channel's receiving terminal frequency-division signal within the $k^{th}$ frequency band, and $Y(k)$ represents the echo-cancelled sending frequency-division signal within the $k^{th}$ frequency band that is fed back.

As compared to the pure transformation-domain structure shown in FIG. 4, the calculation of the decorrelation matrix is simplified in the mixed-domain structure shown in FIG. 5.

However, the transformation-domain structure shown in FIG. 4 is suitable for situations different from the mixed-domain structure shown in FIG. 5. The transformation-domain structure shown in FIG. 4 is suitable for use in a case in which the frequency-power curves of the individual receiving channel signals are significantly different from each other, a typical example of which is a video game scenario. Because the decorrelation matrices vary greatly for different individual frequency bands under that situation, calculation of the decorrelation matrices and decomposition should be carried out separately. The mixed-domain structure shown in FIG. 5 is suitable for use in the case in which the frequency-power curves of the individual receiving channel signals are slightly different from each other, a typical example of which is a stereophonic call or a call with 3D surround soundeffect. Because the decorrelation matrices of the individual frequency bands are similar or identical to each other under that case, the decorrelation decomposition of the individual frequency bands can be carried out by means of a general decomposition matrix.

According to the above descriptions, the technical solutions of the present invention can effectively cancel echoes caused by a plurality of receiving terminals in a sending terminal signal, can support situations of two or more receiving terminals, and are suitable for use in situation in which the correlation between a plurality of receiving terminal signals is variable.

What described above are only preferred embodiments of the present invention but are not intended to limit the scope of the present invention. Accordingly, any modifications, equivalent replacements, improvements or the like that are made according to the spirit and the principle of the present invention shall also fall within the scope of the present invention.

The invention claimed is:

1. A multi-receiving terminal echo cancellation method suitable for use in a communication apparatus comprising M receiving terminals, M being a natural number greater than or equal to 2, the method comprising performing echo filtering on receiving terminal signals in M channels by means of echo filters to obtain filtered receiving terminal signals in M channels, and subtracting the filtered receiving terminal signals in M channels from a sending terminal signal to obtain a system output signal in which receiving terminal echoes have been cancelled; and buffering the receiving terminal signals in M channels by means of buffers at the same time, calculating a decorrelation matrix according to each of the receiving terminal signals in M channels that are buffered within a preset length, decomposing the buffered receiving terminal signals in M channels into decorrelated receiving terminal signals in M channels by means of the decorrelation matrix, and calculating update amounts of the echo filters according to the decorrelation matrix, the decorrelated receiving terminal signals in M channels and the system output signal that is fed back.

2. The method of claim 1, wherein the calculating a decorrelation matrix according to each of the receiving terminal signals in M channels that are buffered within a preset length comprises:

performing an (M−1)-step iterative operation, the initial input of the iterative operation is one signal matrix $x_{(0)}'$ with $L_D$ rows and M columns that is constituted by the buffered receiving terminal signals in M channels, wherein $$x_{(0)}' = [x_{1(0)}'\ x_{2(0)}'\ \ldots\ x_{i(0)}'\ \ldots\ x_{M(0)}'],$$

$$x_{i(0)}' = x_i = \begin{bmatrix} x_i(1) \\ x_i(2) \\ \vdots \\ x_i(L_D) \end{bmatrix}$$

$x_i$ represents the $i^{th}$ channel's buffered receiving terminal signal with a length of $L_D$, $L_D$ represents a data length buffered within a preset time length, and $1 \leq i \leq M$;

the decorrelation matrix $De_1$ is calculated in the first iterative step:

$$De_{(1)} = \begin{bmatrix} 1 & -c_{1,2} & \cdots & -c_{1,M} \\ & 1 & & \\ & & \ddots & 0 \\ 0 & & & 1 \end{bmatrix}$$

wherein the correlation factor is $$c_{1,j} = \frac{\sum_{n=1}^{L_D} x'_{1(0)}(n) x'_{j(0)}(n)}{\sum_{n=1}^{L_D} [x'_{1(0)}(n)]^2}, 1 < j \leq M;$$

the calculation result of the first iterative step is $x_{(1)}' = x_{(0)}' De_1$ $x_{(1)}' = [x_{1(1)}' x_{2(1)}' \ldots x_{i(1)}' \ldots x_{M(1)}']$ the decorrelation matrix $De_1$ is calculated in the $i^{th}$ iterative step:

$$De_{(1)} = \begin{bmatrix} I_{i-1} & & & 0 \\ & 1 & -c_{i,i+1} & -c_{i,M} \\ & & 1 & \\ & & & \ddots & 0 \\ 0 & & & & 1 \end{bmatrix}$$

wherein the correlation factor is:

$$c_{i,j} = \frac{\sum_{n=1}^{L_D} x'_{i(i-1)}(n) x'_{j(i-1)}(n)}{\sum_{n=1}^{L_D} [x'_{i(i-1)}(n)]^2}, M-1 \geq i > 1, M \geq j > i;$$

the calculation result of the $i^{th}$ iterative step is $x_{(1)}' = x_{(i-1)}' De_i$ $x_{(i)}' = [x_{1(i)}' x_{2(i)}' \ldots x_{i(i)}' \ldots x_{M(i)}']$ and through the (M−1)-step iterative operation, the final decorrelation matrix De is obtained by $De = \Pi_{i=1}^{M-1} De_i$.

3. The method of claim 2, wherein the decomposing the buffered receiving terminal signals in M channels into decorrelated receiving terminal signals in M channels by means of the decorrelation matrix, and calculating update amounts of the echo filters according to the decorrelation matrix, the decorrelated receiving terminal signals in M channels and the system output signal that is fed back comprises calculating x'=xDe, wherein x [$x_1$ $x_2$ ... $x_i$ ... $x_M$], and the M columns of signals in the x' are the final decorrelated receiving terminal signals in M channels; and
calculating $$\Delta h_i'(l) = \frac{x_i'(n-l+1)y(n)}{\frac{1}{L_D} \sum_{n=1}^{L_D} x_i'^2(n)}, i = 1, 2, \ldots M$$

$\Delta h_i(l) = De \Delta h_i'(l),$ wherein $\Delta h_i(l)$ represents the update amount of the echo filter corresponding to the $i^{th}$ channel's receiving terminal signal, l represents a sequence number of the update amount of the echo filter, y(n) represents the system output signal that is fed back, and $x_i'(n)$ represents the $n^{th}$ sample data of the $i^{th}$ channel's signal of the decorrelated receiving terminal signals in M channels.

4. The method of claim 2, wherein the performing echo filtering on receiving terminal signals in M channels by means of echo filters to obtain filtered receiving terminal signals in M channels, and subtracting the filtered receiving terminal signals in M channels from a sending terminal signal to obtain the system output signal in which receiving terminal echoes have been cancelled comprises buffering the sending terminal signal and the receiving terminal signals in M channels by means of buffers, decomposing the buffered receiving terminal signal in each channel into receiving frequency-division signals within S frequency bands in a transformation domain, and decomposing the buffered sending terminal signal into sending frequency-division signals within the S frequency bands in the transformation domain, wherein S is a natural number greater than or equal to 2;

within each of the S frequency bands, performing echo filtering on the M receiving frequency-division signals within the frequency band by means of the echo filters to obtain M filtered receiving frequency-division signals within the frequency band; and subtracting the M filtered receiving frequency-division signals within the frequency band from the sending frequency-division signal within the frequency band to obtain an echo-cancelled sending frequency-division signal within the frequency band; and performing frequency-time synthesizing processing on the echo-cancelled sending frequency-division signals within the S frequency bands to obtain the system output signal in which receiving terminal echoes have been cancelled.

5. The method of claim 4, wherein the decomposing the buffered receiving terminal signals in M channels into decorrelated receiving terminal signals in M channels by means of the decorrelation matrix, and calculating update amounts of the echo filters according to the decorrelation matrix, the decorrelated receiving terminal signals in M channels and the system output signal that is fed back comprises after the buffered receiving terminal signal in each channel is decomposed into receiving terminal frequency-division signals within S frequency bands in the transformation domain, for each of the S frequency bands decomposing the receiving frequency-division signals in M channels within the frequency band into decorrelated receiving frequency-division signals in M channels within the frequency band by means of the decorrelation matrix, and calculating the update amounts of the echo filters within the frequency band according to the decorrelation matrix, the decorrelated receiving frequency-division signals in M channels within the frequency band and the echo-cancelled sending frequency-division signal within the frequency band that is fed back.

6. The method of claim 5, wherein the for each of the S frequency bands decomposing the receiving frequency-division signals in M channels within the frequency band into decorrelated receiving frequency-division signals in M channels within the frequency band by means of the decorrelation matrix, and calculating update amounts of the echo filters according to the decorrelation matrix, the decorrelated receiving terminal signals in M channels and the system output signal that is fed back comprises for the $k^{th}$ frequency band with $1 \leq k \leq S$, calculating a matrix $X'(k)=X(k)De$;

wherein $X(k) [X_1(k) X_2(k) \ldots X_i(k) \ldots X_M(k)]$, $X_i(k)$ represents a receiving frequency-division signal of the $i^{th}$ channel's receiving terminal signal within the $k^{th}$ k frequency band, and the M signals in the $X'(k)$ are the final decorrelated receiving frequency-division signals in M channels within the $k^{th}$ frequency band; and calculating $$\Delta H'_i(k) = \frac{X'_i(k)Y(k)}{\frac{1}{2L_w+1}\sum_{l=-L_w}^{l-L_w} |X'_i(\mathrm{mod}(k+l,L_D))^2|}, i=1,2,\ldots M$$

$$\Delta H_i(k) = De\Delta H'_i(k);$$

wherein $\Delta H_i(k)$ represents the update amount of the echo filter corresponding to the $i^{th}$ channel's receiving terminal frequency-division signal within the $k^{th}$ frequency band, and $Y(k)$ represents the echo-cancelled sending frequency-division signal within the $k^{th}$ frequency band that is fed back.

7. The method of claim 1, wherein the performing echo filtering on receiving terminal signals in M channels by means of echo filters to obtain filtered receiving terminal signals in M channels, and subtracting the filtered receiving terminal signals in M channels from a sending terminal signal to obtain the system output signal in which receiving terminal echoes have been cancelled comprises buffering the sending terminal signal and the receiving terminal signals in M channels by means of buffers, decomposing the buffered receiving terminal signal in each channel into receiving frequency-division signals within S frequency bands in a transformation domain, and decomposing the buffered sending terminal signal into sending frequency-division signals within the S frequency bands in the transformation domain, wherein S is a natural number greater than or equal to 2;

within each of the S frequency bands, performing echo filtering on the M receiving frequency-division signals within the frequency band by means of the echo filters to obtain M filtered receiving frequency-division signals within the frequency band; and subtracting the M filtered receiving frequency-division signals within the frequency band from the sending frequency-division signal within the frequency band to obtain an echo-cancelled sending frequency-division signal within the frequency band; and performing frequency-time synthesizing processing on the echo-cancelled sending frequency-division signals within the S frequency bands to obtain the system output signal in which receiving terminal echoes have been cancelled.

8. The method of claim 7, wherein the calculating a decorrelation matrix according to each of the receiving terminal signals in M channels that are buffered within a preset length, decomposing the buffered receiving terminal signals in M channels into decorrelated receiving terminal signals in M channels by means of the decorrelation matrix, and calculating update amounts of the echo filters according to the decorrelation matrix, the decorrelated receiving terminal signals in M channels and the system output signal that is fed back comprises after the buffered receiving terminal signal in each channel is decomposed into receiving frequency-division signals within S frequency bands in the transformation domain, for each of the S frequency bands calculating the decorrelation matrix within the frequency band according to the receiving frequency-division signals in M channels within the frequency band, decomposing the receiving frequency-division signals in M channels within the frequency band into decorrelated receiving frequency-division signals in M channels within the frequency band by means of the decorrelation matrix within the frequency band, and calculating the update amounts of the echo filters within the frequency band according to the decorrelation matrix, the decorrelated receiving frequency-division signals in M channels within the frequency band and the echo-cancelled sending frequency-division signal within the frequency band that is fed back.

9. The method of claim 8, wherein the for each of the S frequency bands calculating the decorrelation matrix within the frequency band according to the receiving frequency-division signals in M channels within the frequency band comprises for the $k^{th}$ frequency band with $1 \leq k \leq S$, performing an $(M-1)$-step iterative operation, the initial input of the iterative operation is one signal matrix $X_{(0)}'(k)$ with 1 row and M columns, wherein $$X_{(0)}'(k)=[X_{1(0)}'(k) X_{2(0)}'(k) \ldots X_{i(0)}'(k) \ldots X_{M(0)}'(k)]$$

$$X_{i(0)}'(k)=X_i(k), i=1,2,\ldots M$$

$X_i(k)$ represents a receiving frequency-division signal of the $i^{th}$ channel's receiving terminal signal within the $k^{th}$ frequency band;

the decorrelation matrix $De_{(1)}(k)$ is calculated in the first iterative step:

$$De_{(1)}(k) = \begin{bmatrix} 1 & -c_{1,2}(k) & \ldots & -c_{1,M}(k) \\ & 1 & & \\ & & \ddots & 0 \\ 0 & & & 1 \end{bmatrix}$$

wherein the correlation factor is $$c_{1,j}(k) = \frac{\sum_{l=-L_w}^{l=L_w} |X'_{1(0)}(\mathrm{mod}(k+l,L_D))^2|}{\sum_{l=-L_w}^{l=L_w} X'_{1(0)}(\mathrm{mod}(k+l,L_D))conj(X'_{j(0)}(\mathrm{mod}(k+l,L_D)))},$$

$$1 < j \leq M;$$

$L_w$ represents a specified length and has a value selected from 3 to 10, conj represents a conjugate operation, mod represents a modular operation, and $L_D$ represents a data length buffered within a preset time length;

the calculation result of the first iterative step is $X'_{(1)}(k)=X'_{(0)}(k)De_{(1)}(k)$ $$X_{(1)}'(k)=[X_{1(1)}'(k) X_{2(1)}'(k) \ldots X_{i(1)}'(k) \ldots X_{M(1)}'(k)]$$

the decorrelation matrix $De_{(i)}(k)$ is calculated in the $i^{th}$ iterative step:

$$De_{(1)}(k) = \begin{bmatrix} I_{i-1} & & & & 0 \\ & 1 & -c_{i,i+1}(k) & \cdots & -c_{i,M}(k) \\ & & 1 & & \\ & & & \ddots & 0 \\ 0 & & & & 1 \end{bmatrix}$$

wherein the correlation factor is $$c_{i,j}(k) = \frac{\sum_{l=-L_w}^{l-L_w} |X'_{i(i)}(\mathrm{mod}(k+l, L_D))^2|}{\sum_{l=-L_w}^{l-L_w} X'_{i(i)}(\mathrm{mod}(k+l, L_D))\mathrm{conj}(X'_{j(i)}(\mathrm{mod}(k+l, L_D)))},$$

$1 < i \le M-1, M \ge j > i$ the calculation result of the $i^{th}$ iterative step is $X'_{(i)}(k) = X'_{(i-1)}(k)De_{(i)}(k)$ $X_{(i)}(k) = [X_{1(i)}'(k) X_{2(i)}'(k) \ldots X_{i(i)}'(k) \ldots X_{M(i)}')k)]$, and through the (M−1)-step iterative operation, the final decorrelation matrix De(k) of the $k^{th}$ frequency band is obtained by $De(k) = \Pi_{i=1}^{M-1} De_{(i)}(k)$.

10. The method of claim 9, wherein the decomposing the receiving frequency-division signals in M channels within the frequency band into decorrelated receiving frequency-division signals in M channels within the frequency band by means of the decorrelation matrix within the frequency band, and calculating the update amounts of the echo filters within the frequency band according to the decorrelation matrix, the decorrelated receiving frequency-division signals in M channels within the frequency band and the echo-cancelled sending frequency-division signal within the frequency band that is fed back comprises calculating $X'(k) = X(k)De(k)$, wherein $X(k) [X_1(k) X_2(k) \ldots X_i(k) \ldots X_M(k)]$, and the M signals in the X'(k) are the decorrelated receiving frequency-division signals in M channels of the $k^{th}$ frequency band; and calculating $$\Delta H_i'(k) = \frac{X_i'(k)Y(k)}{\frac{1}{2L_w+1}\sum_{l=-L_w}^{l-L_w} |X_i'(\mathrm{mod}(k+l, L_D))^2|}, i = 1, 2, \ldots M$$

$\Delta H_i(k) = De(k)\Delta H_i'(k);$ wherein $\Delta H_i(k)$ represents the update amount of the echo filter corresponding to the $i^{th}$ channel's receiving terminal frequency-division signal within the $k^{th}$ frequency band, and Y(k) represents the echo-cancelled sending frequency-division signal within the $k^{th}$ frequency band that is fed back.

11. A multi-receiving terminal echo cancellation system, the system comprising an echo filtering unit and a filtering control unit, wherein the echo filtering unit is configured to receive a sending terminal signal and receiving terminal signals in M channels, perform echo filtering on the receiving terminal signals in M channels under the control of update amounts outputted by the filtering control unit to obtain filtered receiving terminal signals in M channels, and subtract the filtered receiving terminal signals in M channels from the sending terminal signal to obtain a system output signal in which receiving terminal echoes have been cancelled; and the filtering control unit is configured to buffer the receiving terminal signals in M channels, calculate a decorrelation matrix according to each of the receiving terminal signals in M channels that are buffered within a preset length, decompose the buffered receiving terminal signals in M channels into decorrelated receiving terminal signals in M channels by means of the decorrelation matrix, calculate update amounts of echo filters in the echo filtering unit according to the decorrelation matrix, the decorrelated receiving terminal signals in M channels and the system output signal fed back from the echo filtering unit, and output the update amounts to the echo filtering unit.

12. The system of claim 11, wherein the echo filtering unit comprises one echo filter set and one subtractor set, the echo filter set consists of M echo filters, and the subtractor set consists of M subtractors connected in series;

the filtering control unit comprises M buffers with a preset length, one decorrelation matrix calculating module, one signal decorrelation decomposing module and one filtering controller;

the M echo filters are configured to receive the receiving terminal signals in M channels in one-to-one correspondence, perform echo filtering on the receiving terminal signals in M channels, respectively, under the control of the update amounts outputted by the filtering control unit to obtain filtered receiving terminal signals in M channels, and output the filtered receiving terminal signals in M channels to the M subtractors connected in series in one-to-one correspondence;

the first subtractor of the M subtractors connected in series receives the sending terminal signal, subtracts the received filtered receiving terminal signal from the sending terminal signal and then outputs the resulted signal to the next stage subtractor; each of the subsequent subtractors subtracts the received filtered receiving terminal signal from the signal outputted by the previous stage subtractor and then outputs the resulted signal; and the output of the last subtractor is the system output signal in which receiving terminal echoes have been cancelled;

the M buffers with a preset length are configured to buffer the receiving terminal signals in M channels, respectively, and output the buffered receiving terminal signals in M channels of the preset length to the decorrelation matrix calculating module and the signal decorrelation decomposing module;

the decorrelation matrix calculating module is configured to calculate the decorrelation matrix according to the received receiving terminal signals in M channels of the preset length and output the decorrelation matrix to the signal decorrelation decomposing module and the filtering controller;

the signal decorrelation decomposing module is configured to decompose the received receiving terminal signals in M channels of the preset length into decorrelated receiving terminal signals in M channels according to the received decorrelation matrix and then output the decorrelated receiving terminal signals in M channels to the filtering controller; and the filtering controller is configured to calculate the update amounts of the M echo filters according to the received decorrelation matrix, the decorrelated receiving terminal signals in M channels and the system output signal fed back from the M$^{th}$ subtractor and output the update amounts to the corresponding echo filters.

13. The system of claim 12, wherein
the signal decorrelation decomposing module is configured to decompose the received receiving terminal signals in M channels of the preset length into decorrelated receiving terminal signals in M channels through calculation of x'=xDe;
wherein De represents the decorrelation matrix received by the signal decorrelation decomposing module, x [x$_1$ x$_2$ ... x$_i$ ... x$_M$] represents the received receiving terminal signals in M channels of the preset length, and the M columns of signals in the x' are the final decorrelated receiving terminal signals in M channels; and
the filtering controller is configured to calculate the update amounts of the M echo filters according to the following formulas:

$$\Delta h'_i(l) = \frac{x'_i(n-l+1)y(n)}{\frac{1}{L_D}\sum_{n=1}^{L_D} x'^2_i(n)}, i = 1, 2, \ldots M$$

$$\Delta h_i(l) = De\Delta h'_i(l)$$

wherein $\Delta h_i(l)$ represents the update amount of the echo filter corresponding to the i$^{th}$ channel's receiving terminal signal, l represents a sequence number of the update amount of the echo filter, y(n) represents the system output signal that is fed back, and x$_i$'(n) represents the n$^{th}$ sample data of the i$^{th}$ channel's signal of the decorrelated receiving terminal signals in M channels.

14. The system of claim 11, wherein the echo filtering unit comprises one sending terminal buffer, one sending terminal frequency-band decomposing module, S echo filter sets, S subtractor sets and one frequency-band synthesizing module, each of the subtractor sets consists of M subtractors connected in series, and each of the echo filter sets comprises M echo filters;
the sending terminal buffer is configured to buffer the sending terminal signal, and each time after buffering the sending terminal signal of a preset length, output the sending terminal signal of the preset length to the sending terminal frequency-band decomposing module;
the sending terminal frequency-band decomposing module is configured to decompose each sending terminal signal of the preset length from the sending terminal buffer into sending frequency-division signals within S frequency bands in a transformation domain and then output the sending frequency-division signals to the S subtractor sets, respectively;
both the S echo filter sets and the S subtractor sets are in one-to-one correspondence to the S frequency bands;
each of the echo filter sets is configured to perform echo filtering on the received M receiving frequency-division signals under the control of the corresponding update amounts outputted by the filtering controller in the filtering control unit and output the M filtered receiving frequency-division signals to the corresponding subtractor set;
each of the subtractor sets is configured to receive the sending frequency-division signal and the M filtered receiving frequency-division signals within the corresponding frequency band, subtract the M filtered receiving frequency-division signals sequentially from the sending frequency-division signal to obtain an echo-cancelled sending frequency-division signal, and then output the echo-cancelled sending frequency-division signal to the frequency-band synthesizing module and meanwhile feed the echo-cancelled sending frequency-division signal back to the filtering controller in the filtering control unit; and
the frequency-band synthesizing module is configured to perform frequency-time synthesizing processing on the echo-cancelled sending frequency-division signals within the S frequency bands from the S subtractor sets to obtain the system output signal.

15. The system of claim 14, wherein the filtering control unit comprises M receiving terminal buffers, M receiving terminal frequency-band decomposing modules, S decorrelation matrix calculating modules and S filtering control modules, and each of the filtering control modules comprises one signal decorrelation decomposing module and one filtering controller, wherein
the M receiving terminal buffers are in one-to-one correspondence to the M receiving terminal signals, and the M receiving terminal frequency-band decomposing modules are in one-to-one correspondence to the M receiving terminal buffers;
each of the receiving terminal buffers is configured to buffer the corresponding receiving terminal signal, and each time after buffering the receiving terminal signal of the preset length, output the receiving terminal signal of the preset length to the corresponding receiving terminal frequency-band decomposing module;
each of the receiving terminal frequency-band decomposing modules is configured to decompose each receiving terminal signal of the preset length from the corresponding receiving terminal buffer into receiving frequency-division signals within S frequency bands in a transformation domain and then output the receiving frequency-division signals to the echo filtering unit, the S decorrelation matrix calculating modules and the signal decorrelation decomposing modules of the S filtering control modules, respectively;
both the S decorrelation matrix calculating modules and the S filtering control modules are in one-to-one correspondence to the S frequency bands;
each of the decorrelation matrix calculating modules is configured to calculate the decorrelation matrix according to the received M receiving frequency-division signals and output the decorrelation matrix to the corresponding signal decorrelation decomposing module and filtering controller;
each of the signal decorrelation decomposing modules is configured to decompose the received M receiving frequency-division signals into decorrelated receiving frequency-division signals in M channels according to the received decorrelation matrix and then output the decorrelated receiving frequency-division signals in M channels to the corresponding filtering controller; and
each of the filtering controllers is configured to calculate the update amounts of the echo filters in the echo filtering unit according to the received decorrelation matrix, the decorrelated receiving frequency-division signals in M channels and the echo-cancelled sending frequency-division signal fed back from the corresponding subtractor set and output the update amounts to the echo filtering unit.

16. The system of claim 14, wherein the filtering control unit comprises M receiving terminal buffers, one decorrelation matrix calculating module, M receiving terminal frequency-band decomposing modules and S filtering control modules, and each of the filtering control modules comprises one signal decorrelation decomposing module and one filtering controller, wherein the M receiving terminal buffers are in one-to-one correspondence to the M receiving terminal signals, and the M receiving terminal frequency-band decomposing modules are in one-to-one correspondence to the M receiving terminal buffers;

each of the receiving terminal buffers is configured to buffer the corresponding receiving terminal signal, and each time after buffering the receiving terminal signal of the preset length, output the receiving terminal signal of the preset length to the corresponding receiving terminal frequency-band decomposing module and the decorrelation matrix calculating module;

each of the receiving terminal frequency-band decomposing modules is configured to decompose each receiving terminal signal of the preset length from the corresponding receiving terminal buffer into receiving frequency-division signals within S frequency bands in a transformation domain and then output the receiving frequency-division signals to the echo filtering unit and the signal decorrelation decomposing modules of the S filtering control modules, respectively;

the decorrelation matrix calculating module is configured to calculate a decorrelation matrix according to the receiving terminal signals in M channels of the preset length received each time and output the decorrelation matrix to the signal decorrelation decomposing modules of the S filtering control modules and the filtering controllers;

the S filtering control modules are in one-to-one correspondence to the S frequency bands;

each of the signal decorrelation decomposing modules is configured to decompose the received M receiving frequency-division signals into decorrelated receiving frequency-division signals in M channels according to the received decorrelation matrix and then output the decorrelated receiving frequency-division signals in M channels to the corresponding filtering controller; and each of the filtering controllers is configured to calculate the update amounts of the echo filters in the echo filtering unit according to the received decorrelation matrix, the decorrelated receiving frequency-division signals in M channels and the echo-cancelled sending frequency-division signal fed back from the corresponding subtractor set and output the update amounts to the echo filtering unit.

17. The system of claim 12 or claim 16, wherein the decorrelation matrix calculating module is configured to calculate the decorrelation matrix in the following way according to the received receiving terminal signals in M channels of the preset length:

performing an (M−1)-step iterative operation, the initial input of the iterative operation is one signal matrix $x_{(0)}'$ with $L_D$ rows and M columns that is constituted by the buffered receiving terminal signals in M channels, wherein $$x_{(0)}' = [x_{1(0)}'\ x_{2(0)}' \cdots x_{i(0)}' \cdots x_{M(0)}'],$$

$$x_{i(0)}' = x_i = \begin{bmatrix} x_i(1) \\ x_i(2) \\ \vdots \\ x_i(L_D) \end{bmatrix}$$

$x_i$ represents the $i^{th}$ channel's buffered receiving terminal signal with a length of $L_D$, $L_D$ represents a data length buffered within a preset time length, and $1 \le i \le M$;

the decorrelation matrix $De_1$ is calculated in the first iterative step:

$$De_1 = \begin{bmatrix} 1 & -c_{1,2} & \cdots & -c_{1,M} \\ & 1 & & \\ & & \ddots & 0 \\ 0 & & & 1 \end{bmatrix}$$

wherein the correlation factor is $$c_{1,j} = \frac{\sum_{n=1}^{L_D} x_{1(0)}'(n) x_{j(0)}'(n)}{\sum_{n=1}^{L_D} [x_{1(0)}'(n)]^2}, 1 < j \le M;$$

the calculation result of the first iterative step is $x_{(1)}' = x_{(0)}' De_1$ $$x_{(1)}' = [x_{1(1)}'\ x_{2(1)}' \cdots x_{i(1)}' \cdots x_{M(1)}']$$

the decorrelation matrix $De_i$ is calculated in the $i^{th}$ iterative step:

$$De_i = \begin{bmatrix} I_{i-1} & & & & 0 \\ & 1 & -c_{i,i+1} & & -c_{i,M} \\ & & 1 & & \\ & & & \ddots & 0 \\ 0 & & & & 1 \end{bmatrix}$$

wherein the correlation factor is:

$$c_{i,j} = \frac{\sum_{n=1}^{L_D} x_{i(i-1)}'(n) x_{j(i-1)}'(n)}{\sum_{n=1}^{L_D} [x_{i(i-1)}'(n)]^2}, M-1 \ge i > 1, M \ge j > i;$$

the calculation result of the $i^{th}$ iterative step is $x_{(i)}' = x_{(i-1)}' De_i$ $$x_{(i)}' = [x_{1(i)}'\ x_{2(i)}' \cdots x_{i(i)}' \cdots x_{M(i)}'], \text{ and}$$

through the (M−1)-step iterative operation, the final decorrelation matrix De is obtained by $De = \Pi_{i=1}^{M-1} De_i$.

18. The system of claim 16, wherein
the signal decorrelation decomposing module is configured to decompose the received M receiving frequency-division signals within the frequency band into decorrelated receiving frequency-division signals in M channels through calculation of $X'(k) = X(k)De$;
wherein De represents the decorrelation matrix received by the signal decorrelation decomposing module, $X(k) [X_1(k) X_2(k) \ldots X_i(k) \ldots X_M(k)]$ represents the received M receiving frequency-division signals within the frequency band, and the M signals in the X'(k) are the decorrelated receiving frequency-division signals in M channels within the frequency band; and the filtering controller is configured to calculate the update amounts of the M echo filters according to the following formulas:

$$\Delta H'_i(k) = \frac{X'_i(k)Y(k)}{\frac{1}{2L_w+1}\sum_{l=-L_w}^{l-L_w} |X'_i(\text{mod}(k+l, L_D))|^2}, i = 1, 2, \ldots M$$

$$\Delta H_i(k) = De\Delta H'_i(k);$$

wherein $\Delta H_i(k)$ represents the update amount of the echo filter corresponding to the $i^{th}$ channel's receiving terminal frequency-division signal within the $k^{th}$ frequency band, and Y(k) represents the echo-cancelled sending frequency-division signal within the $k^{th}$ frequency band that is fed back.

19. The system of claim 15, wherein the decorrelation matrix calculating module is configured to calculate the decorrelation matrix in the following way according to the received M receiving frequency-division signals:

for the $k^{th}$ frequency band with $1 \leq k \leq S$, performing an (M−1)-step iterative operation, the initial input of the iterative operation is one signal matrix $X_{(0)}'(k)$ with 1 row and M columns, wherein $$X_{(0)}'(k)=[X_{1(0)}'(k) X_{2(0)}'(k) \ldots X_{i(0)}'(k) \ldots X_{M(0)}'(k)]$$

$$X_{i(0)}'(k)=X_i(k), i=1,2,\ldots M$$

$X_i(k)$ represents a receiving frequency-division signal of the $i^{th}$ channel's receiving terminal signal within the $k^{th}$ frequency band;

the decorrelation matrix $De_{(1)}(k)$ is calculated in the first iterative step:

$$De_{(1)}(k) = \begin{bmatrix} 1 & -c_{1,2}(k) & \cdots & -c_{1,M}(k) \\ & 1 & & \\ & & \ddots & 0 \\ 0 & & & 1 \end{bmatrix}$$

wherein the correlation factor is $$c_{1,j}(k) = \frac{\sum_{l=-L_w}^{l-L_w} |X'_{1(0)}(\text{mod}(k+l, L_D))|^2}{\sum_{l=-L_w}^{l-L_w} X'_{1(0)}(\text{mod}(k+l, L_D))\text{conj}(X'_{j(0)}(\text{mod}(k+l, L_D)))},$$

$$1 < j \leq M;$$

$L_w$ represents a specified length and has a value selected from 3 to 10, conj represents a conjugate operation, mod represents a modular operation, and $L_D$ represents a data length buffered within a preset time length;

the calculation result of the first iterative step is $X'_{(1)}(k)=X'_{(0)}(k)De_{(1)}(k)$ $$X_{(1)}'(k)=[X_{1(1)}'(k) X_{2(1)}'(k) \ldots X_{i(1)}'(k) \ldots X_{M(1)}'(k)]$$

the decorrelation matrix $De_{(i)}(k)$ is calculated in the $i^{th}$ iterative step:

$$De_i(k) = \begin{bmatrix} I_{i-1} & & & 0 \\ & 1 & -c_{i,i+1}(k) & -c_{i,M}(k) \\ & & 1 & \\ & & & \ddots & 0 \\ 0 & & & & 1 \end{bmatrix}$$

wherein the correlation factor is $$c_{i,j}(k) = \frac{\sum_{l=-L_w}^{l-L_w} |X'_{i(i)}(\text{mod}(k+l, L_D))|^2}{\sum_{l=-L_w}^{l-L_w} X'_{i(i)}(\text{mod}(k+l, L_D))\text{conj}(X'_{j(i)}(\text{mod}(k+l, L_D)))},$$

$$1 < i \leq M-1, M \geq j > i$$

the calculation result of the $i^{th}$ iterative step is $X'_{(i)}(k)=X'_{(i-1)}(k)De_{(i)}(k)$ $$X_{(i)}'(k)=[X_{1(i)}'(k) X_{2(i)}'(k) \ldots X_{1(i)}'(k) \ldots X_{M(i)}'(k)],$$
and through the (M−1)-step iterative operation, the final decorrelation matrix $De(k)$ of the $k^{th}$ frequency band is obtained by $De(k)=\Pi_{i=1}^{M-1}De_{(i)}(k)$.

20. The system of claim 19, wherein the signal decorrelation decomposing module is configured to decompose the received M receiving frequency-division signals within the frequency band into decorrelated receiving frequency-division signals in M channels through calculation of $X'(k)=X(k)De(k)$;

wherein $X(k) [X_1(k) X_2(k) \ldots X_i(k) \ldots X_M(k)]$ represents the received M receiving frequency-division signals within the frequency band, and the M signals in the X'(k) are the decorrelated receiving frequency-division signals in M channels within the $k^{th}$ frequency band; and the filtering controller is configured to calculate the update amounts of the M echo filters according to the following formulas:

$$\Delta H'_i(k) = \frac{X'_i(k)Y(k)}{\frac{1}{2L_w+1}\sum_{l=-L_w}^{l-L_w} |X'_i(\text{mod}(k+l, L_D))|^2}, i = 1, 2, \ldots M$$

$$\Delta H_i(k) = De(k)\Delta H'_i(k);$$

wherein $\Delta H_i(k)$ represents the update amount of the echo filter corresponding to the $i^{th}$ channel's receiving terminal frequency-division signal within the $k^{th}$ frequency band, and Y(k) represents the echo-cancelled sending frequency-division signal within the $k^{th}$ frequency band that is fed back.

* * * * *